(12) United States Patent
Okamura et al.

(10) Patent No.: US 9,728,210 B2
(45) Date of Patent: Aug. 8, 2017

(54) TEXTURE-CONTROL LAYER FOR SPIN TORQUE OSCILLATOR

(71) Applicant: HGST Netherlands B.V., Amsterdam (NL)

(72) Inventors: Susumu Okamura, Fujisawa (JP); Yo Sato, Odawara (JP); Keiichi Nagasaka, Isehara (JP); Masashige Sato, Atsugi (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 14/952,682

(22) Filed: Nov. 25, 2015

(65) Prior Publication Data
US 2017/0148474 A1    May 25, 2017

(51) Int. Cl.
G11B 5/235    (2006.01)
G11B 5/31    (2006.01)
G11B 5/127    (2006.01)
G11B 5/00    (2006.01)

(52) U.S. Cl.
CPC .......... *G11B 5/3146* (2013.01); *G11B 5/1278* (2013.01); *G11B 5/235* (2013.01); *G11B 5/314* (2013.01); G11B 2005/0024 (2013.01)

(58) Field of Classification Search
None
See application file for complete search history.

(56) References Cited

U.S. PATENT DOCUMENTS

| 8,467,149 B2 | 6/2013 | Takeo et al. | |
|---|---|---|---|
| 8,780,500 B2 | 7/2014 | Shirotori et al. | |
| 8,824,104 B1 | 9/2014 | Koui et al. | |
| 8,953,282 B2 | 2/2015 | Shiroishi et al. | |
| 9,355,655 B1* | 5/2016 | Udo et al. | G11B 5/1278 |
| 2009/0257151 A1* | 10/2009 | Zhang et al. | G01R 33/098 |
| | | | 360/324.2 |
| 2011/0096443 A1* | 4/2011 | Zhang et al. | G11B 5/1278 |
| | | | 360/324.2 |
| 2011/0216447 A1* | 9/2011 | Li et al. | G11B 5/1278 |
| | | | 360/313 |
| 2011/0279921 A1* | 11/2011 | Zhang et al. | G11B 5/1278 |
| | | | 360/59 |
| 2013/0271866 A1 | 10/2013 | Sato | |
| 2013/0302649 A1 | 11/2013 | Takahashi et al. | |
| 2014/0063648 A1* | 3/2014 | Shiroishi et al. | G11B 5/235 |
| | | | 360/75 |
| 2014/0146420 A1* | 5/2014 | Shimizu et al. | G11B 5/1278 |
| | | | 360/125.28 |

OTHER PUBLICATIONS

Seki, T. et al., "High Power All-Metal Spin Torque Oscillator Using Full Heusler Co2(Fe,Mn)Si," Applied Physics Letters, vol. 105, No. 9, Sep. 2014, 6 pages.

* cited by examiner

*Primary Examiner* — Craig A. Renner

(57) ABSTRACT

A magnetic field-assisted magnetic recording (MAMR) head is provided, which includes a recording main pole and a texture control layer (TCL), a seed control layer, and a spin torque oscillator (STO) positioned over the main pole, in this order, in a stacking direction from a leading side to a trailing side of the recording head. The STO has a crystallographic preferred growth orientation and includes a spin polarized layer (SPL). The TCL may include a Cu layer.

20 Claims, 11 Drawing Sheets

FGL = FIELD GENERATING LAYER
SPL = SPIN POLARIZED LAYER
STO = SPIN TORQUE OSCILLATOR
TCL = TEXTURE CONTROL LAYER
MP = MAIN POLE

| Seed Layer | Crystal structure | Bs x Thickness of SPL (T nm) | Heusler rocking FWHM angle (degrees) | Spin torque efficiency (A.U.) |
|---|---|---|---|---|
| Ru(15 Å) | hcp | 3.9 | - | 0.62 |
| NiAl(15 Å) | bcc | 4.1 | - | 0.73 |
| Ru(15 Å)/NiAl(15 Å) | hcp/bcc | 4.4 | 6 (good) | 0.91 |
| Ru(15 Å)/Cr(15 Å) | hcp/bcc | 4.3 | - | 0.85 |
| Pt(15 Å)/NiAl(15 Å) | fcc/bcc | 4.3 | - | 0.85 |
| Ru(30 Å) | hcp | 4.1 | 7 (good) | 0.73 |
| Pt(30 Å) | fcc | 4.0 | 7 (good) | 0.67 |
| NiAl(30 Å) | bcc | 4.2 | 11 (poor) | 0.79 |

FIG. 6

FGL = FIELD GENERATING LAYER
SPL = SPIN POLARIZED LAYER
TCL = TEXTURE CONTROL LAYER
MP = MAIN POLE

FGL = FIELD GENERATING LAYER
SPL = SPIN POLARIZED LAYER
SL = SEED LAYER
TCL = TEXTURE CONTROL LAYER
MP = MAIN POLE

PERIODIC TABLE

| H | | | | | | | | | | | | | | | | | He |
|---|---|---|---|---|---|---|---|---|---|---|---|---|---|---|---|---|---|
| Li | Be | | | | | | | | | | | B | C | N | O | F | Ne |
| Na | Mg | | | | | | | | | | | Al | Si | P | S | Cl | Ar |
| K | Ca | Sc | Ti | V | Cr | Mn | Fe | Co | Ni | Cu | Zn | Ga | Ge | As | Se | Br | Kr |
| Rb | Sr | Y | Zr | Nb | Mo | Tc | Ru | Rh | Pd | Ag | Cd | In | Sn | Sb | Te | I | Xe |
| Cs | Ba | La | Hf | Ta | W | Re | Os | Ir | Pt | Au | Hg | Tl | Pb | Bi | Po | At | Rn |

Group Y: Zr, Nb, Hf, Ta
Group X: Cr, Cu
Group Z: B, C

FIG. 10

| Texture control layer | Bs x thickness of SPL (T nm) | Spin torque efficiency (A.U.) |
|---|---|---|
| Ta(15 Å) | 3.6 | 0.46 |
| Cu(15 Å)/Ta(15 Å) | 4.4 | 0.91 |
| CoFeBTa(5 Å) | 4.4 | 0.91 |
| CoFeBTa(10 Å) | 4.4 | 0.91 |

FIG. 11

TEXTURE-CONTROL LAYER FOR SPIN TORQUE OSCILLATOR

BACKGROUND

The present invention relates to a magnetic recording head having a function for inducing magnetization reversal by applying a high-frequency magnetic field to a magnetic recording medium, and to a magnetic recording and reproduction device.

In order to achieve higher recording densities for a magnetic recording head mounted in a hard disk device, it is necessary to narrow the width and pitch of write tracks, and thus correspondingly narrow the magnetically recorded bits encoded in each write track. One challenge in narrowing the width and pitch of write tracks is decreasing a surface area of a main pole of the magnetic recording head at an air bearing surface of the recording media. Specifically, as the main pole becomes smaller, the recording field becomes smaller as well, limiting the effectiveness of the magnetic recording head, and at some degree of miniaturization, with prior technology it is no longer possible to achieve a recording field sufficient to effectively record magnetic information into the media with such a conventional recording head. One prior technology that has been proposed to address this issue is a high-frequency magnetic field-assisted recording method (MAMR: microwave-assisted magnetic recording), in which a spin torque oscillator is formed on the main pole, and a high-frequency magnetic field is applied to the recording medium in order to reduce the coercive force of the medium, and in this state, a recording field is applied to the medium in order to record data. In addition, a method has also been proposed in which the recording portion of the main pole is inclined with respect to the substrate surface, a spin torque oscillator is disposed on the inclined surface, and the head field intensity is effectively increased.

One challenge with spin torque oscillators is that it is difficult to manufacture them to have a high spin torque efficiency. High spin torque efficiency during MAMR improves the performance of the spin torque oscillator. One factor that can negatively affect spin torque efficiency is defects in the crystal orientation of the materials forming the spin torque oscillator. Point and long range defects in the crystal growth of the spin torque oscillator can cause the spin polarization and/or perpendicular anisotropy (Hk) in the spin polarized layer (SPL) and/or field generating layer (FGL) to decrease, resulting in a lack of spin torque efficiency.

SUMMARY

To address these issues, a magnetic field-assisted magnetic recording (MAMR) head is provided, which includes a recording main pole and a texture control layer (TCL), a seed control layer, and a spin torque oscillator (STO) positioned over the main pole, in this order, in a stacking direction from a leading side to a trailing side of the recording head. The STO has a crystallographic preferred growth orientation and includes a spin polarized layer (SPL). The TCL may include a Cu layer.

It will be appreciated that the texture-control layer inhibits unfavorable crystallographic plane growth with a random growth orientation and promotes close-packed plane growth, resulting in a preferred growth orientation for all grains. Thus, a close-packed plane configuration with a preferred growth orientation can be achieved for the material that forms the spin torque oscillator, which is grown atop the texture control layer. As a result, the claimed configuration may achieve the potential advantage that crystallographic defects in the spin torque oscillator are reduced and a larger spin torque efficiency is obtained.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which like reference numerals indicate like elements and in which:

FIG. 6 is a table with experimental examples illustrating the spin torque oscillator properties resulting from various structural configurations of the seed layer according to the first embodiment of the present disclosure;

FIG. 10 is a periodic table illustrating the elements X, Y, and Z in the alloy of the TCL comprising X—Y—Z according to the third embodiment of the present disclosure; and FIG. 11 is a table with experimental examples illustrating the spin torque oscillator properties resulting from various structural configurations of the TCL according to the third embodiment of the present disclosure.

DETAILED DESCRIPTION

Figure 1:
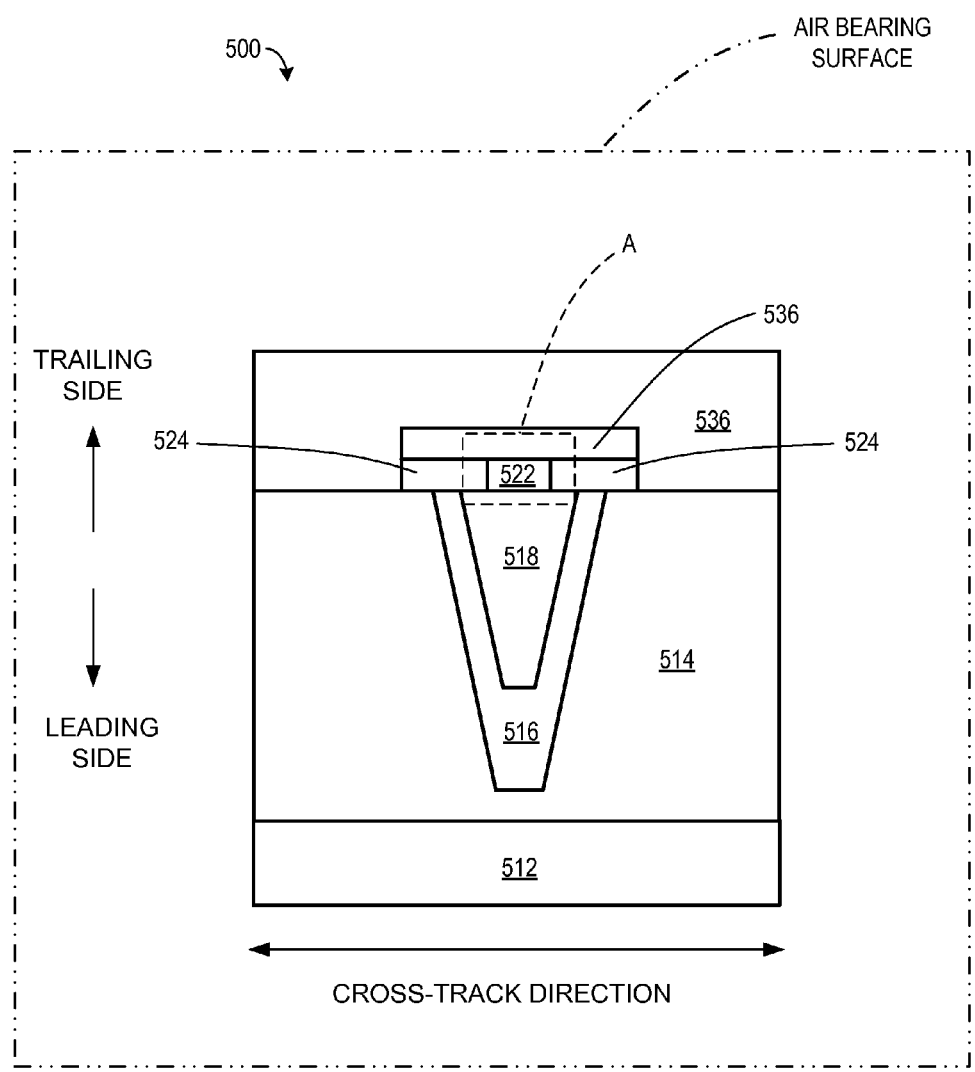
FIG. 1 is a plan view of an air bearing surface of a conventional MAMR magnetic recording head.

Referring to FIG. 1, a plan view of an air bearing surface (ABS) of a conventional MAMR magnetic recording head 500 is shown. The MAMR magnetic recording head 500 comprises a main pole 518 adapted for producing a writing magnetic field, a spin torque oscillator 522 that is positioned on the main pole 518, a trailing gap 524 positioned on the sides of the spin torque oscillator 522, a trailing shield 536 positioned on the trailing gap 524 and the spin torque oscillator 522 on a trailing side of the main pole 518, a side shield 514 positioned on at least on side of the main pole 518 in a cross-track direction and set on a substrate 512, and a side gap 516 positioned between the side shield 514 and the main pole 518. During manufacturing, the main pole 518 is typically plated on top of the side gap 516 in a trench configuration. The main pole 518 is configured to emit a recording magnetic field for affecting a magnetic medium, the main pole 518 serving as an electrode and having a front portion at the ABS. The main pole 518 typically comprises small grain CoFe or CoFeNi in a random crystalline orientation. The trailing shield 536 is a magnetic film serving as an electrode, positioned over a trailing side surface of the main pole 518. The spin torque oscillator 522 that is positioned on the main pole 518 reduces the coercive force of the medium, so that smaller recording fields can be used to record data. The side gap 516 is typically a non-magnetic film.

Figure 2:
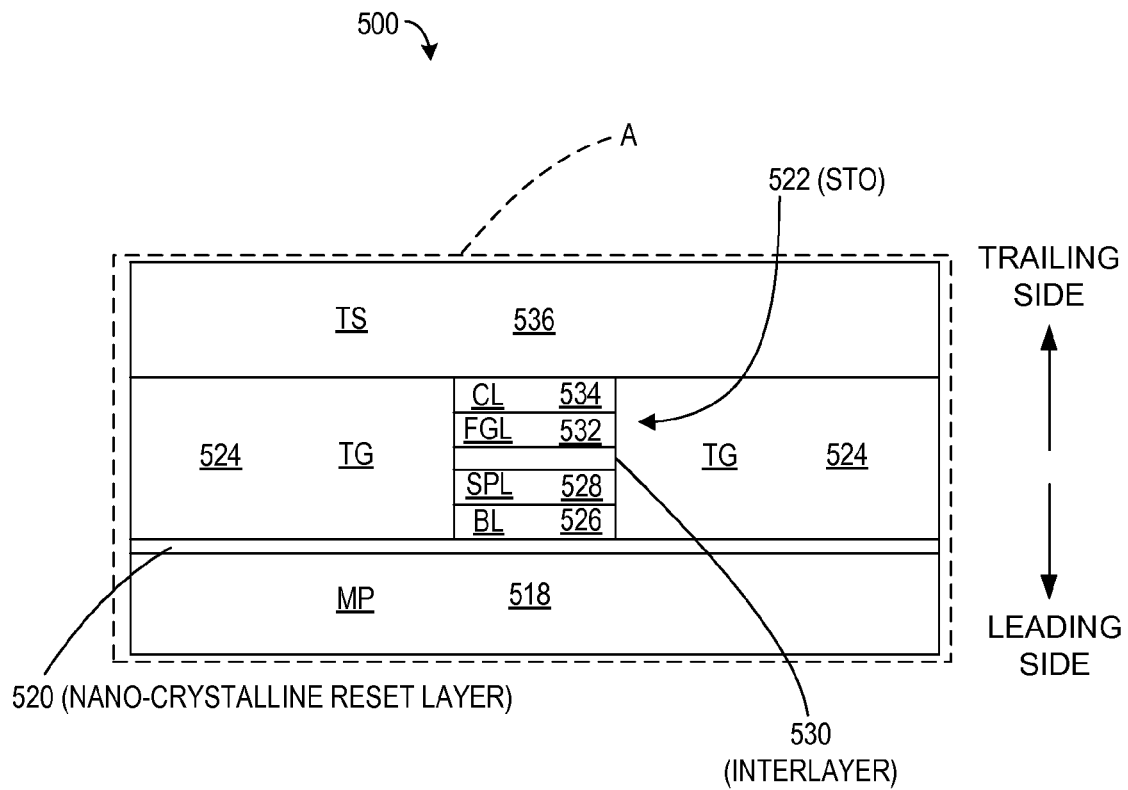
FIG. 2 is a detailed plan view of an air bearing surface of a conventional MAMR magnetic recording head.

Turning to FIG. 2, a magnified view of section A of FIG. 1, depicting a detailed plan view of an air bearing surface of a spin torque oscillator 522 of the conventional MAMR recording head 500 of FIG. 1, is shown. The conventional recording head 500 comprises the spin torque oscillator 522, the main pole 518, and the trailing shield 536 where the spin torque oscillator 522 is positioned between the main pole 518 and the trailing shield 536. There is a trailing gap 524 on each side of the spin torque oscillator 522. An interlayer 530, a spin polarized layer (SPL) 528, and a field generating layer (FGL) 532 are stacked and formed such that the interlayer 530 is positioned between the SPL 528 and the FGL 532. The FGL 532 may be configured as a Hi-P (Heusler alloy) hybrid type, an Hk-induced type, or a Hi-Bs type. The SPL 528 may be configured as a Hi-P (Heusler alloy) type, a Hi-Hk (Co/Pt, Co/Ni) type, or a combination type (hi-Hk+hi-P). A cap layer 534 may be positioned between the trailing shield 536 and the field generating layer 532, and a buffer layer 526 may be positioned between the main pole 518 and the SPL 528. A nano-crystalline reset layer 520, usually comprising Ta, is positioned between the main pole 518 and the spin torque oscillator 522 to improve the orientation and regularity of the crystalline growth of the spin torque oscillator 522.

However, in conventional recording heads, the nano-crystalline reset layer 520 actually does not improve crystalline orientation and regularity of the spin torque oscillator 522 very well when positioned on top of bcc-type layers, especially a main pole 518 comprising small grain CoFe or CoFeNi in a random crystalline orientation. Consequently, the resulting spin torque oscillator 522 that grows on top of the nano-crystalline reset layer 520 often has a poor crystalline structure with structural point and long range defects. Furthermore, the spin torque oscillator 522 often has poor anisotropy (Hk) if the SPL 528 is configured as a Hi-Hk (Co/Pt, Co/Ni) type, and poor saturation flux density (Bs) and/or polarization (P) if Heusler alloys are configured in at least the SPL 528 or the field generating layer 532.

With the state of the prior art explained above, a selected embodiment of the present invention will now be described with reference to the accompanying drawings. It will be apparent to those skilled in the art from this disclosure that the following description of an embodiment of the invention is provided for illustration only and not for the purpose of limiting the invention as defined by the appended claims and their equivalents.

Figure 3:
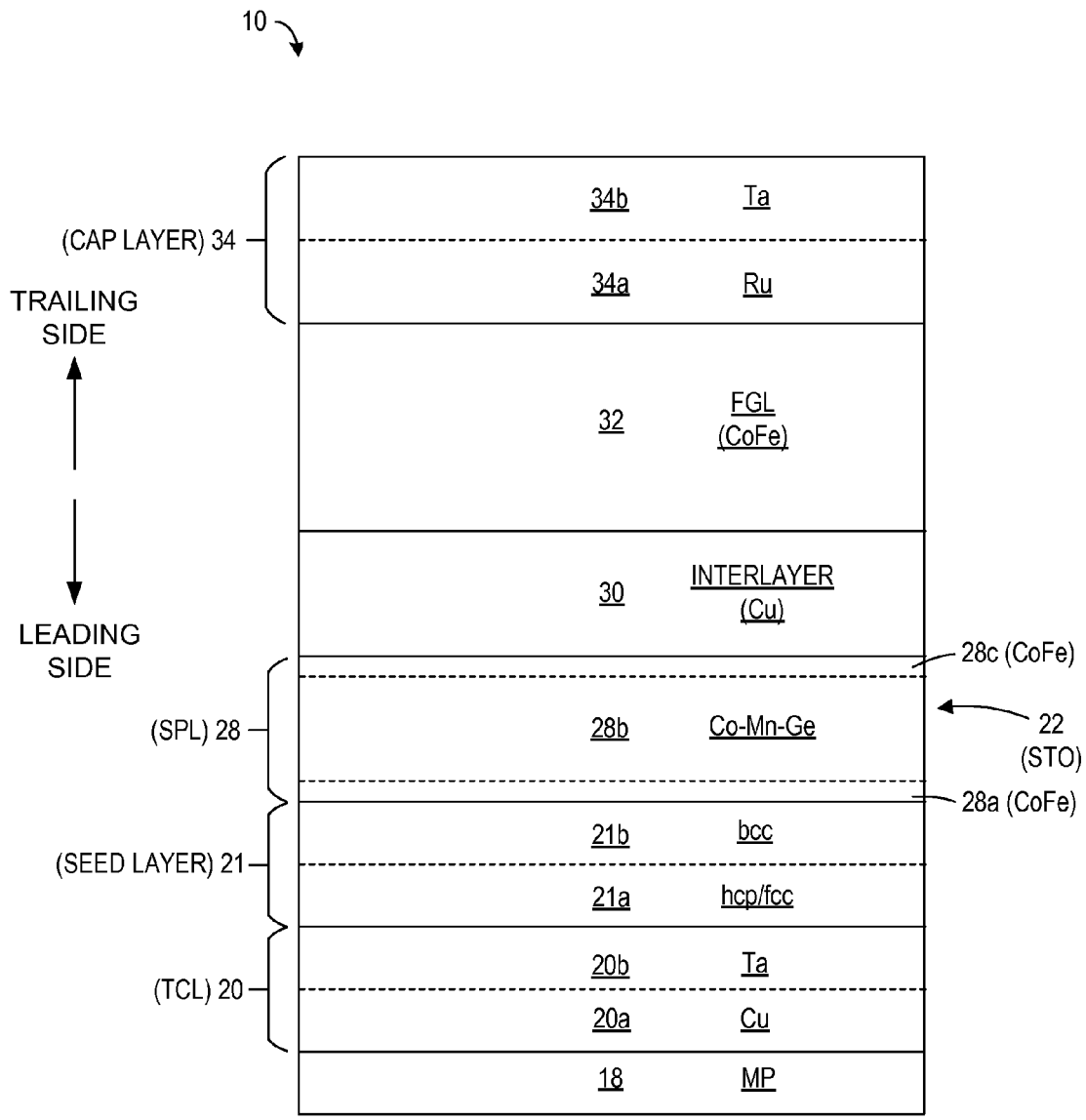
FIG. 3 is a detailed plan view of an air bearing surface of a magnetic recording head according to a first embodiment of the present disclosure.

Referring to FIG. 3, a magnified, detailed plan view of an air bearing surface of a magnetic field-assisted magnetic recording (MAMR) head 10 according to a first embodiment of the invention is shown, where the SPL 28 is configured as a Hi-P (Heusler alloy) type configuration. To address the above issues, the nanocrystalline reset layer 520 and the buffer layer 526 in the conventional MAMR recording head 500 have been replaced by a texture control layer (TCL) 20 and a seed layer 21. For the sake of brevity, the trailing gap and the layers above the cap layer 34 have been omitted in this view. Positioned over the main pole 18 are a TCL 20, a seed layer 21, and a spin torque oscillator 22, which comprises a SPL 28 and FGL 32 with an interlayer 30 in between, and a cap layer 34 in this order, in a stacking direction from the leading side to the trailing side of the recording head 10. The TCL 20 comprises a Cu layer 20a and a Ta layer 20b, in this order, in an orientation relaxing configuration. The seed layer 21 comprises an hcp or fcc layer 21a and a bcc layer 21b, in this order. The SPL 28 comprises a Co—Mn—Ge (CMG) layer 28b sandwiched between two CoFe layers 28a and 28c in a Hi-P (Heusler alloy) type configuration, where the Co—Mn—Ge layer (CMG) 28b is preferably 20 to 30 Å thick and each CoFe layer is 4 to 6 Å thick. The interlayer 30 may comprise a Cu layer, which may be 25 to 35 Å thick. The FGL 32 may comprise a CoFe layer, which may be 45 to 55 Å thick. The cap layer 34 may comprise a Ru layer 34a, and a Ta layer 34b, in this order, where the Ru layer 34a may be 15 to 25 Å thick, and the Ta layer 34b may be 15 to 25 Å thick. It will be appreciated that a hard disk drive or an assisted recording device may comprise the claimed MAMR head.

Figure 4:
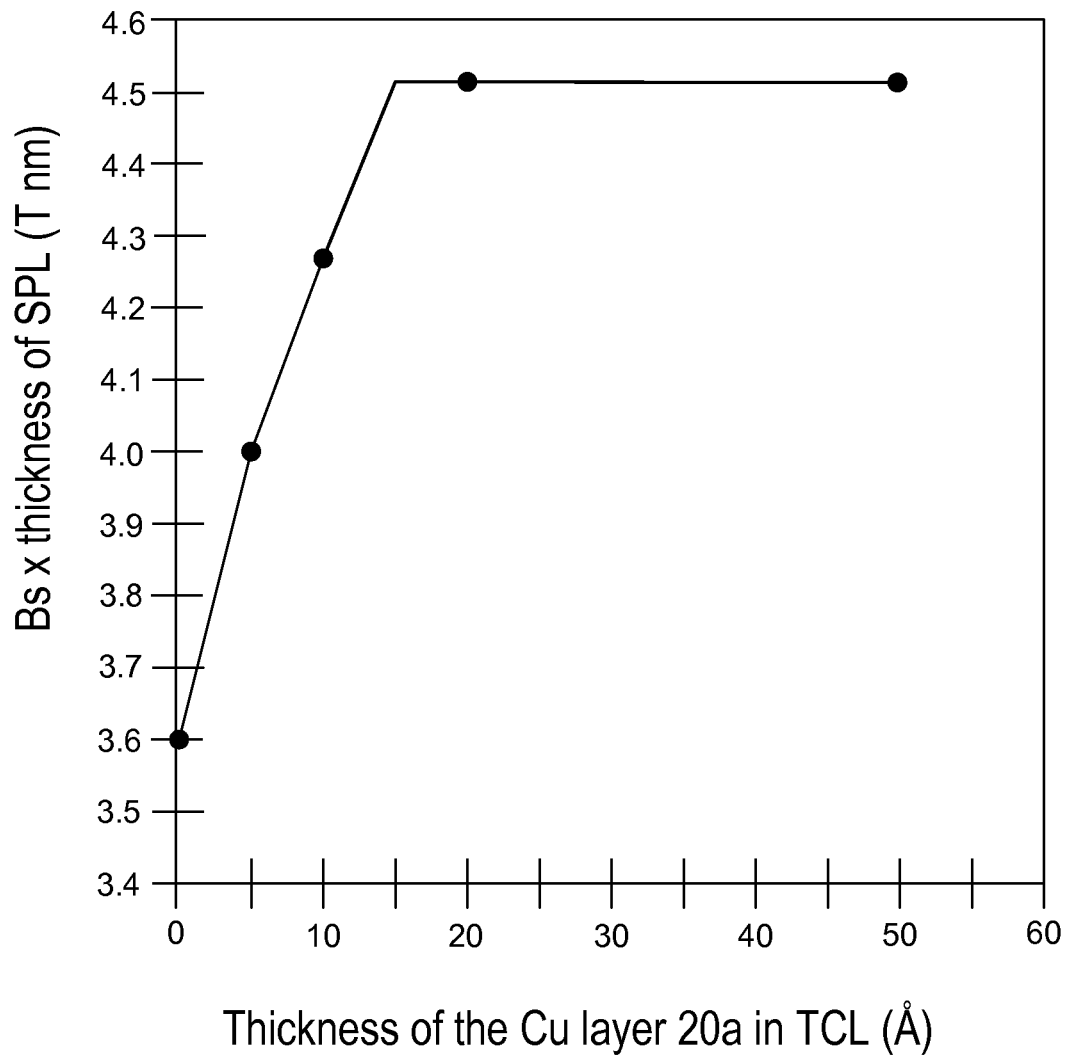
FIG. 4 is a plot illustrating the dependence of the product of the saturation flux density (Bs) and thickness of the SPL on the thickness of the Cu layer in the TCL according to the first embodiment of the present disclosure.
Figure 5:
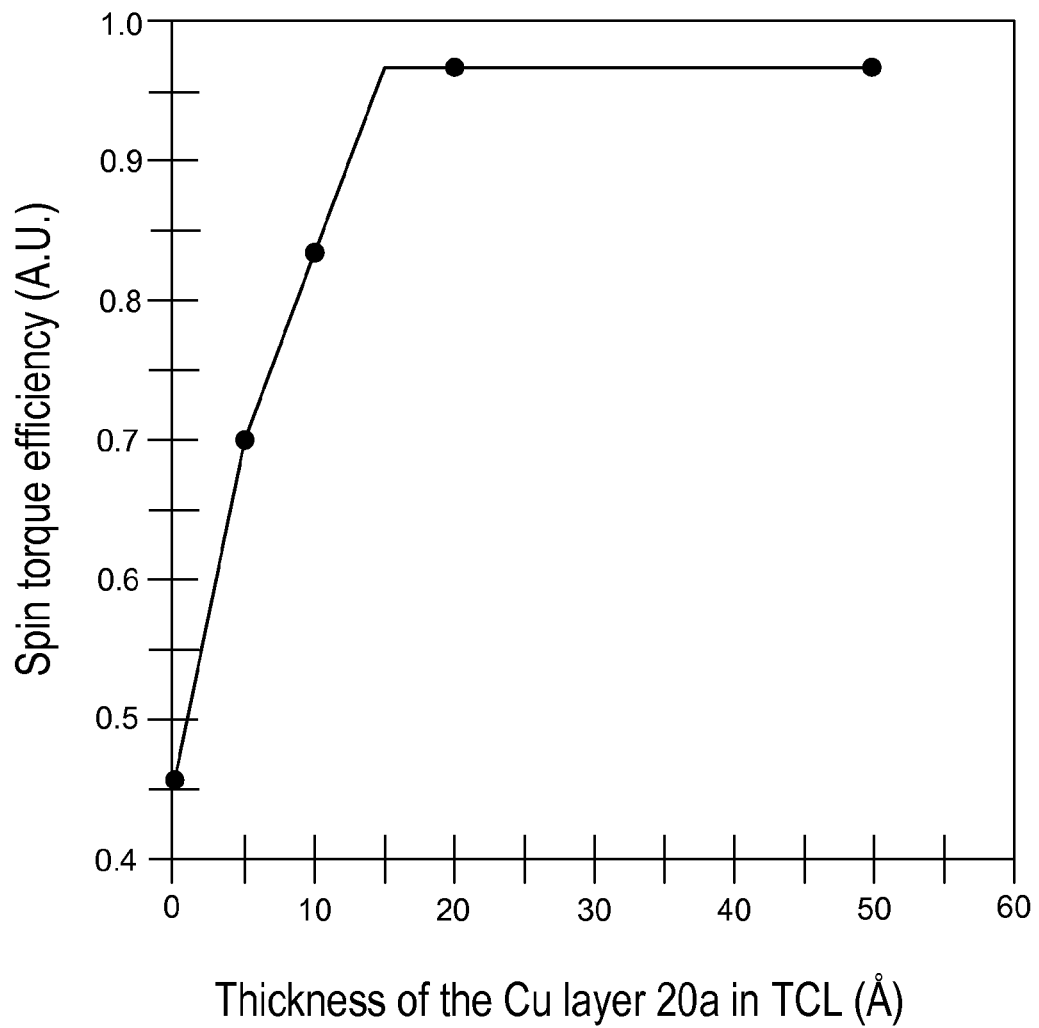
FIG. 5 is a plot illustrating the dependence of the spin torque efficiency of the SPL on the thickness of the Cu layer in the TCL according to the first embodiment of the present disclosure.

Referring to FIG. 4, in the first embodiment of the invention, the product of the saturation flux density (Bs) and thickness of the SPL 28 is dependent on the thickness of the Cu layer 20a in the TCL 20, where the SPL 28 is configured as a Hi-P (Heusler alloy) type configuration. Alternatively, referring to FIG. 5, the spin torque efficiency of the SPL 28 is dependent on the thickness of the Cu layer 20a in the TCL 20. Experimental evidence was compiled by configuring the Cu layer 20a of the TCL 20 at five thicknesses between 0 and 50 Å while the Ta layer 20b of the TCL 20 was fixed at a thickness of 15 Å, measuring the resulting saturation flux density (Bs) of the SPL 28 and calculating the product of the saturation flux density (Bs) and thickness of the SPL 28. Alternatively, at each thickness of the Cu layer 20a, the saturation flux density (Bs) of the SPL 28 was measured and its polarization (P) estimated, and the measured Bs and estimated P were used to calculate the spin torque efficiency of the SPL 28 in relative units (A.U.). The experimental evidence suggests that, for the SPL 28, the optimal spin torque efficiency and saturation flux density (Bs) can be achieved with a thickness of the Cu layer 20a of the TCL 20 of at least 15 Å. This is a significant improvement compared to the spin torque efficiency and saturation flux density (Bs) of conventional recording heads, illustrated by the data point for a TCL with no Cu layer 20a and only a Ta layer 20b, essentially corresponding to a conventional nano-crystalline reset layer comprising Ta. Thus, the configuration of the TCL 20 in this manner results in the growth of a spin torque oscillator 22 with a good crystalline structure with few structural defects and a preferred growth orientation despite growing over a bcc-type main pole 18 with a small grain and random orientation. This configuration results in favorable spin torque oscillator properties including high saturation flux density (Bs), polarization (P), and spin torque efficiency, where a product of the saturation flux density (Bs) of the SPL and a thickness of the SPL is at least 4.3 T nm and the STO has a spin torque efficiency of at least 0.85 A.U. for the SPL with CoFe(0.5 nm)/Co—Mn—Ge(2.5 nm)/CoFe(0.5 nm).

Referring to the table in FIG. 6, the product of Bs and thickness of the SPL (Bst value), the FWHM angle of XRD rocking curve of Heusler SPL, and spin torque efficiency of the SPL are shown for various configurations of the seed layer 21, including the first embodiment of the invention as depicted in FIG. 3, where the SPL 28 is configured as a Hi-P (Heusler alloy) type configuration. For each experimental example, the spin torque efficiency of the SPL 28 was calculated by using the measured Bs and estimated P of the SPL 28. The experimental evidence suggests that the best spin torque efficiency and saturation flux density (Bs) of the SPL are achieved when the crystal structure of the seed layer 21 is configured as a bcc layer on top of an hcp layer, or when configured as a bcc layer on top of an fcc layer, as illustrated by the third through fifth experimental examples which correspond to the first embodiment. In the third experimental example, when the hcp layer 21a was configured as 15 Å of Ru and the bcc layer 21b was configured as 15 Å of NiAl, a Bst value of 4.4 T nm and a spin torque efficiency of 0.91 A.U. were achieved for the SPL 28. In the fourth experimental example, when the hcp layer 21a was configured as 15 Å of Ru and the bcc layer 21b was configured as 15 Å of Cr, a Bst value of 4.3 and a spin torque efficiency of 0.85 A.U. were achieved for the SPL 28. In the fifth experimental example, when the fcc layer 21a was configured as 15 Å of Pt and the bcc layer 21b was configured as 15 Å of NiAl, a Bst value of 4.3 T nm and a spin torque efficiency of 0.85 A.U. were achieved for the SPL 28. It will be appreciated that these Bst values and spin torque efficiencies are a significant improvement over those achieved by seed layers in which the crystal structure merely comprises a single layer of hcp, bcc, or fcc, as illustrated by the first, second, sixth, seventh, and eighth experimental examples. Thus, the configuration of the seed layer 21 in this manner results in the growth of a spin torque oscillator 22 with a good crystalline structure with few structural defects and good orientation despite growing over a bcc-type main pole 18 with a small grain and random orientation. The configuration results in favorable spin torque oscillator properties including high saturation flux density (Bs), FWHM angle of XRD rocking curve of Heusler SPL, and spin torque efficiency.

Figure 7:
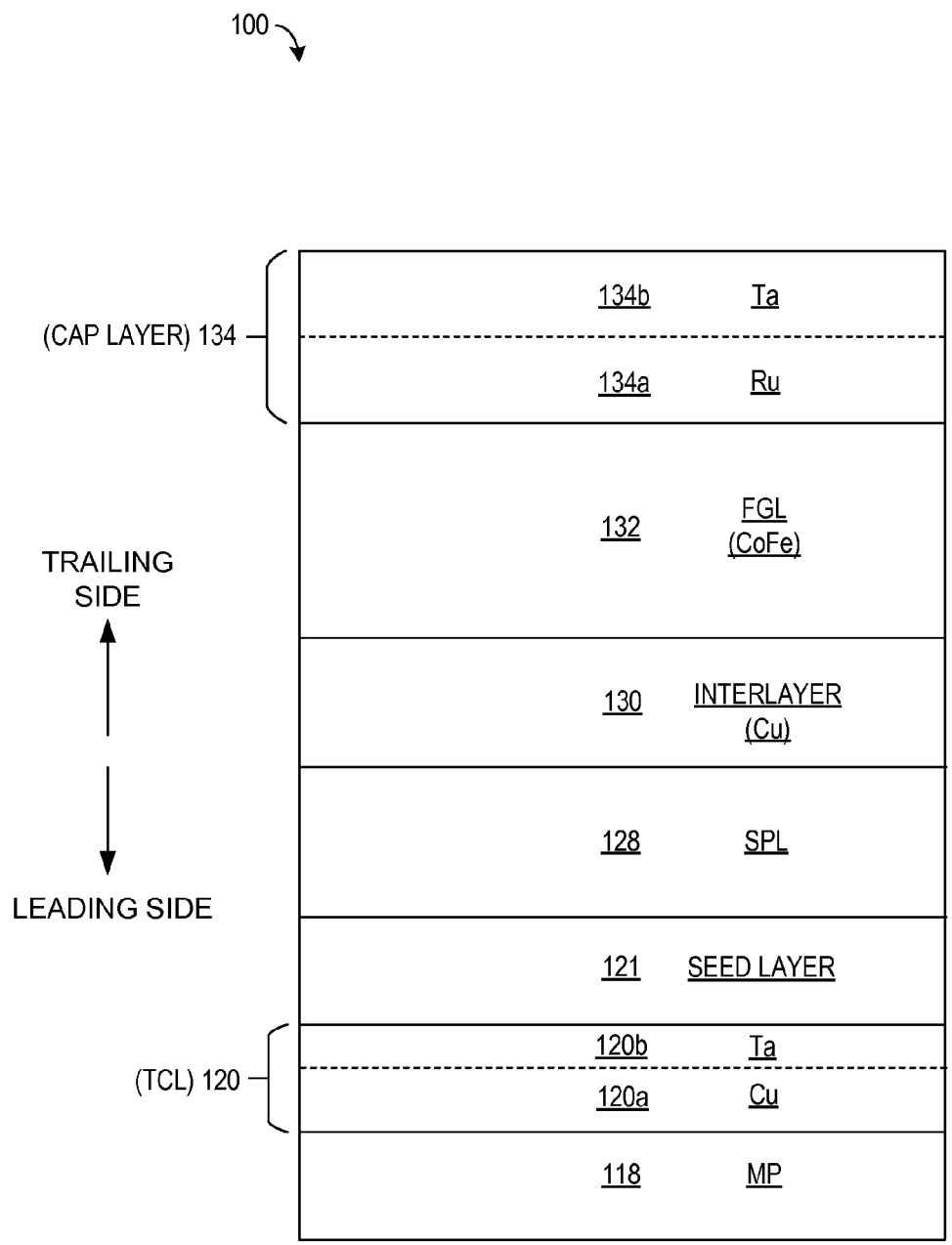
FIG. 7 is a detailed plan view of an air bearing surface of a magnetic recording head according to a second embodiment of the present disclosure.

Referring to FIG. 7, a magnified, detailed plan view of an air bearing surface of a magnetic field-assisted magnetic recording (MAMR) head 100 according to a second embodiment of the invention is shown, where the SPL 128 is configured as a Hi-Hk type configuration. In this recording head 100, the nanocrystalline reset layer 520 and the buffer layer 526 in the conventional MAMR recording head 500 have been replaced by a TCL 120 and a seed layer 121. For the sake of brevity, the trailing gap and the layers above the cap layer 134 have been omitted in this view. Positioned above the main pole 118 are a TCL 120, a seed layer 121, a SPL 128, an interlayer 130, FGL 132, and a cap layer 134, in this order from the leading side to the trailing side of the recording head 100. The TCL 120 comprises a Cu layer 120a and a Ta layer 120b, in this order. The seed layer 121 comprises a single Pt layer with a thickness of 20 to 30 Å. The SPL 128 comprises three consecutive layers of Co/Pt or Co/Ni in a Hi-Hk type configuration. The interlayer 130 may comprise a Cu layer, which may be 25 to 35 Å thick. The FGL 132 may comprise a CoFe layer, which may be 45 to 55 Å thick. The cap layer 134 may comprise a Ru layer 134a, and a Ta layer 134b, in this order, where the Ru layer 134a may be 15 to 25 Å thick, and the Ta layer 134b may be 15 to 25 Å thick.

Figure 8:
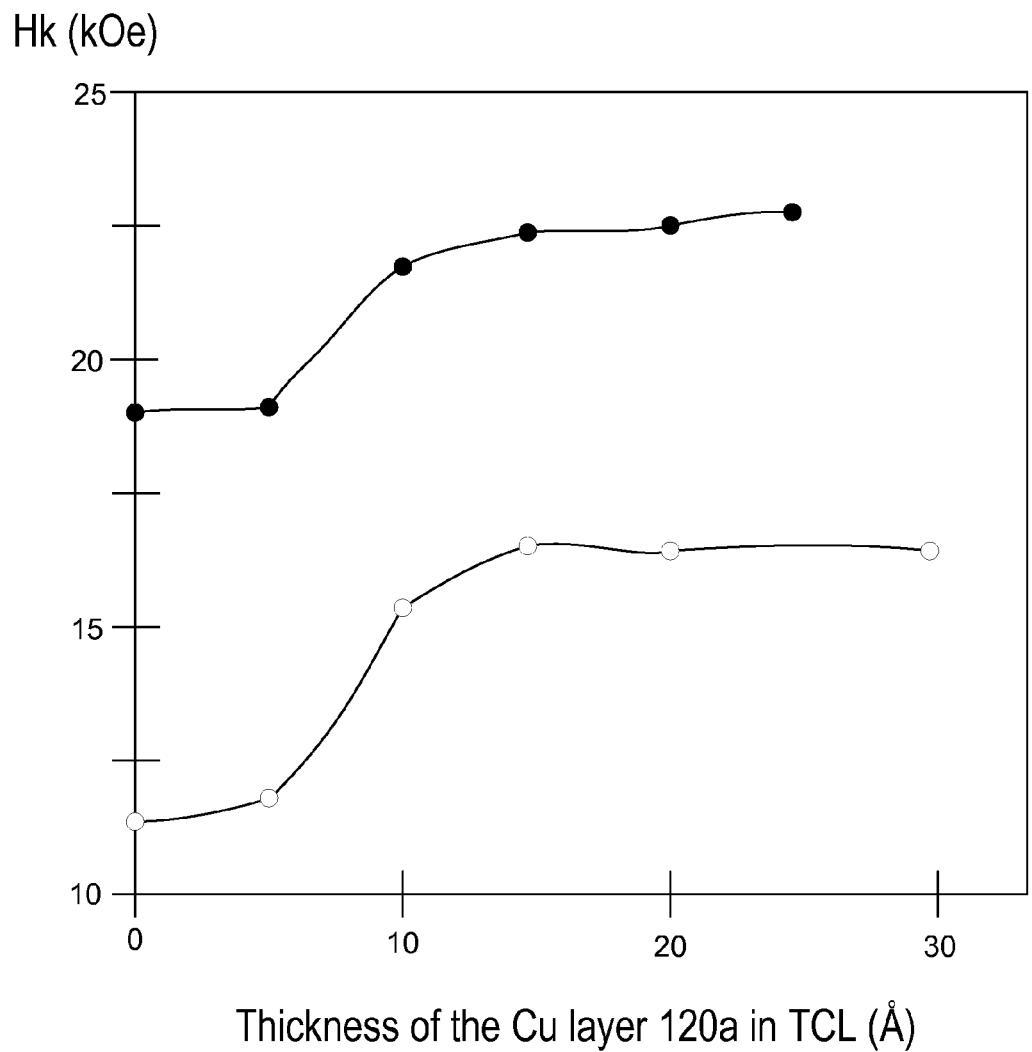
FIG. 8 is a plot illustrating the dependence of the anisotropy (Hk) on the thickness of the Cu layer in the TCL according to the second embodiment of the present disclosure.

Referring to FIG. 8, the anisotropy (Hk) of the SPL 128 is dependent on the thickness of the Cu layer 120a in the TCL 120, where the SPL 128 is configured as a Hi-Hk type or Med-Hk type configuration. Experimental evidence was compiled to show the relationship between the anisotropy (Hk) of the SPL 128 and the thickness of the Cu layer 120a in the TCL 120 as depicted between two cases: the first case, represented by the dark dots, in which the SPL 128 is configured as a Low-P (low polarization) & Hi-Hk (high anisotropy) type comprising three consecutive layers of Co/Pt, and the second case, represented by the white dots, in which the SPL 128 is configured as a Med-P (medium polarization) & Med-Hk (medium anisotropy) type comprising three consecutive layers of Co/Ni. For both cases, the experimental evidence suggests that, where the SPL 128 is configured at a thickness of 25 Å, the optimal anisotropy (Hk) of the SPL 128 can be achieved at a Cu layer 120a thickness of approximately 15 Å. This is a significant improvement compared to the anisotropy of conventional recording heads, illustrated by the data points for a TCL with no Cu layer 120a and only a Ta layer 120b, essentially corresponding to a conventional nano-crystalline reset layer comprising Ta. Therefore, like the first embodiment, the configuration of the TCL 120 in this manner results in the growth of a spin torque oscillator 122 with a good crystalline structure with few structural defects and good growth orientation despite growing over a bcc-type main pole 118 with a small grain and random orientation, resulting in favorable spin torque oscillator properties including high saturation flux density (Bs), anisotropy (Hk), and polarization (P).

Figure 9:
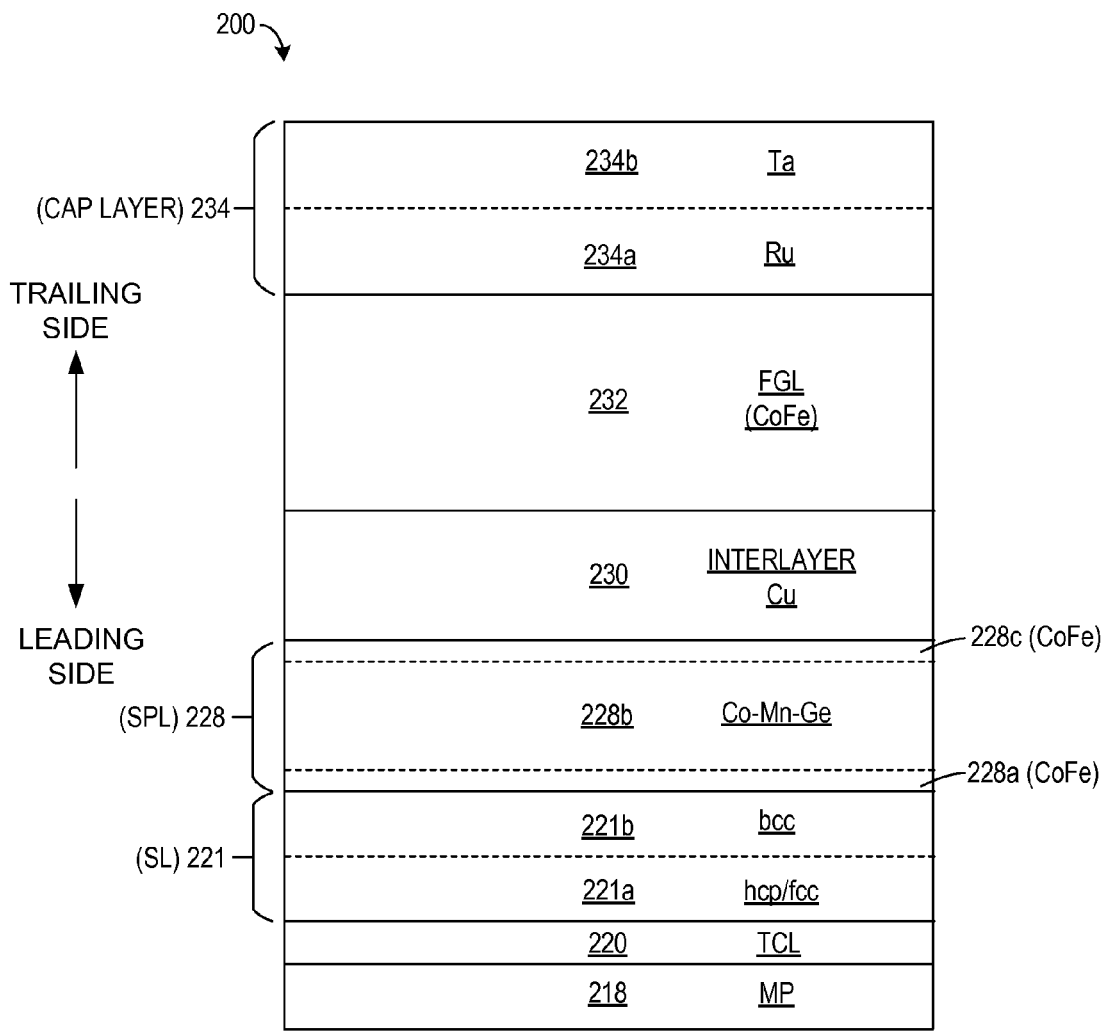
FIG. 9 is a detailed plan view of an air bearing surface view of a magnetic recording head according to a third embodiment of the present disclosure.

Referring to FIG. 9, a magnified, detailed plan view of an air bearing surface of a magnetic field-assisted magnetic recording (MAMR) head 200 according to a third embodiment of the invention is shown, where the SPL 228 is configured as a Hi-P (Heusler alloy) type configuration. In this recording head 200, the nanocrystalline reset layer 520 and the buffer layer 526 in the conventional MAMR recording head 500 have been replaced by a TCL 220 and a seed layer 221. For the sake of brevity, the trailing gap and the layers above the cap layer 234 have been omitted in this view. Positioned above the main pole 218 are a TCL 220, a seed layer 221, a SPL 228, an interlayer 230, FGL 232, and cap layer 234, in this order from the leading side to the trailing side of the recording head 200. The TCL 220 is an alloy comprising X—Y—Z, where X is one or two transition metals selected from a group consisting of Cr, Mn, Fe, Co, Ni, and Cu; Y is a metal selected from a group consisting of Zr, Nb, Hf, and Ta; and Z is an element selected from a group consisting of boron and carbon. The seed layer 221 comprises an hcp layer 221a and a bcc layer 221b, in this order. The hcp layer 221a may be a Ru layer with a thickness of 10 to 20 Å, while the bcc layer 221b may be a NiAl layer with a thickness of 10 to 20 Å. The SPL 228 comprises a Co—Mn—Ge (CMG) layer 228b sandwiched between two CoFe layers 228a and 228c in a Hi-P (Heusler alloy) type configuration, where the Co—Mn—Ge (CMG) layer 228b is preferably 25 Å thick and each CoFe layer is 5 Å thick. The interlayer 230 may comprise a Cu layer 230, which may be 30 Å thick. The FGL 232 may comprise a CoFe layer, which may be 50 Å thick. The cap layer 234 may comprise a Ru layer 234a, and a Ta layer 234b, in this order, where the Ru layer 234a may be 20 Å thick, and the Ta layer 234b may be 20 Å thick.

Referring to FIG. 10, the locations of elements X, Y, and Z in the alloy of TCL 220 comprising X—Y—Z are illustrated in the periodic table, which lists each element. As shown in the periodic table, transition metal X is one or two elements selected from a group consisting of Cr, Mn, Fe, Co, Ni, and Cu, transition metal Y is selected from a group consisting of Zr, Nb, Hf, and Ta, and element Z is selected from a group consisting of boron and carbon. The groups for transition metals X and Y were selected so that the difference in the atomic radii of any pair of transition metals X and Y would be at least greater than 12%. Likewise the group for element Z was selected so that the difference in the atomic radii of any pair of transition metal X and element B or transition metal Y and element B would be at least greater than 12%. Maintaining these differences in atomic radii between the different elements in the alloy comprising X—Y—Z achieves the stable, hard amorphous properties of the TCL 220 of the third embodiment.

Turning to the table in FIG. 11, the product of Bs and thickness of the SPL-(Bst value) and the spin torque efficiency are shown for various configurations of the TCL 220, including the third embodiment of the invention as depicted in FIG. 9, where the SPL 228 is configured as a Hi-P (Heusler alloy) type configuration. For each experimental example, the spin torque efficiency of the SPL 228 was calculated by using the measured Bs and estimated P of the SPL 228. The experimental evidence suggests that a saturation flux density (Bs) and spin torque efficiency that are comparable to the first embodiment (see the second experimental example) can be achieved when the TCL 220 is configured as a CoFeBTa alloy with a thickness of 5 or 10 Å as illustrated by the third and fourth experimental examples which correspond to the third embodiment. In the third embodiment, when the TCL 220 was configured as 5 Å, and in the fourth embodiment, when the TCL 220 was configured as 10 Å, a spin torque efficiency of 0.91 A.U. was achieved for the SPL 228. The resulting spin torque efficiency was comparable to that of the first embodiment, where the TCL was configured as a 15 Å Cu layer and a 15 Å Ta layer. This is a significant improvement compared to the spin torque efficiency of conventional recording heads, illustrated by the first experimental example for a TCL with no Cu layer and only a Ta layer, essentially corresponding to a conventional nano-crystalline reset layer comprising Ta. Thus, the configuration of the TCL 220 in this manner results in the growth of a spin torque oscillator 222 with a good crystalline structure with few structural defects and good orientation despite growing over a bcc-type main pole 18 with a small grain and random orientation, resulting in favorable spin torque oscillator properties including high saturation flux density (Bs), polarization (P), and spin torque efficiency.

It will be understood that the configurations and/or approaches described herein are exemplary in nature, and that these specific embodiments or examples are not to be considered in a limiting sense, because numerous variations are possible.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A magnetic field-assisted magnetic recording (MAMR) head comprising:
   a recording main pole; and
   a texture control layer (TCL), a seed layer, and a spin torque oscillator (STO) positioned over the main pole, in this order in a stacking direction from a leading side to a trailing side of the recording head, wherein
   the STO comprises a spin polarized layer and a field generating layer; and
   the TCL comprises at least a Cu layer contacting and interfacing with the main pole.

2. The MAMR head of claim 1, wherein
   the spin polarized layer comprises three layers of Co/Pt or Co/Ni.

3. The MAMR head of claim 1, wherein
   a thickness of the Cu layer is at least 15 Å.

4. The MAMR head of claim 1, wherein
   the TCL comprises a Ta layer positioned above the Cu layer.

5. A hard disk drive comprising the MAMR head of claim 1.

6. An assisted recording system comprising the MAMR head of claim 1.

7. A magnetic field-assisted magnetic recording (MAMR) head comprising:
   a recording main pole; and
   a texture control layer (TCL), a seed layer, and a spin torque oscillator (STO) positioned over the main pole, in this order in a stacking direction from a leading side to a trailing side of the recording head, wherein
   the STO comprises a spin polarized layer and a field generating layer; and
   the spin polarized layer comprises a Co—Mn—Ge (CMG) layer sandwiched by two CoFe layers.

8. A hard disk drive comprising the MAMR head of claim 7.

9. A magnetic field-assisted magnetic recording (MAMR) head comprising:
   a recording main pole; and
   a texture control layer (TCL), a seed layer, and a spin torque oscillator (STO) positioned over the main pole, in this order in a stacking direction from a leading side to a trailing side of the recording head, wherein
   the TCL comprises an alloy X—Y—Z comprising element(s) X, element Y, and element Z, wherein
   X is one or two transition metals selected from a group consisting of Cr, Mn, Fe, Co, Ni, and Cu;
   Y is a metal selected from a group consisting of Zr, Nb, Hf, and Ta; and
   Z is an element selected from a group consisting of boron and carbon.

10. The MAMR head of claim 9, wherein
    the TCL comprises an alloy CoFeBTa.

11. The MAMR head of claim 9, wherein
    a thickness of the TCL is at least 5 Å.

12. A hard disk drive comprising the MAMR head of claim 9.

13. A magnetic field-assisted magnetic recording (MAMR) head comprising:
    a recording main pole; and
    a texture control layer (TCL), a seed layer, and a spin torque oscillator (STO) positioned over the main pole, in this order in a stacking direction from a leading side to a trailing side of the recording head, wherein
    the seed layer comprises a bcc layer positioned above an hcp layer.

14. The MAMR head of claim 13, wherein
    the hcp layer comprises Ru.

15. The MAMR head of claim 13, wherein
    the bcc layer comprises NiAl or Cr.

16. A hard disk drive comprising the MAMR head of claim 13.

17. A magnetic field-assisted magnetic recording (MAMR) head comprising:

a recording main pole; and a texture control layer (TCL), a seed layer, and a spin torque oscillator (STO) positioned over the main pole, in this order in a stacking direction from a leading side to a trailing side of the recording head, wherein the seed layer comprises a bcc layer positioned above an fcc layer.

18. The MAMR head of claim 17, wherein the fcc layer comprises Pt.

19. The MAMR head of claim 17, wherein the bcc layer comprises NiAl or Cr.

20. A hard disk drive comprising the MAMR head of claim 17.

* * * * *